(No Model.)
F. I. LESSARD.
PIPE JOINT.
No. 424,801. Patented Apr. 1, 1890.
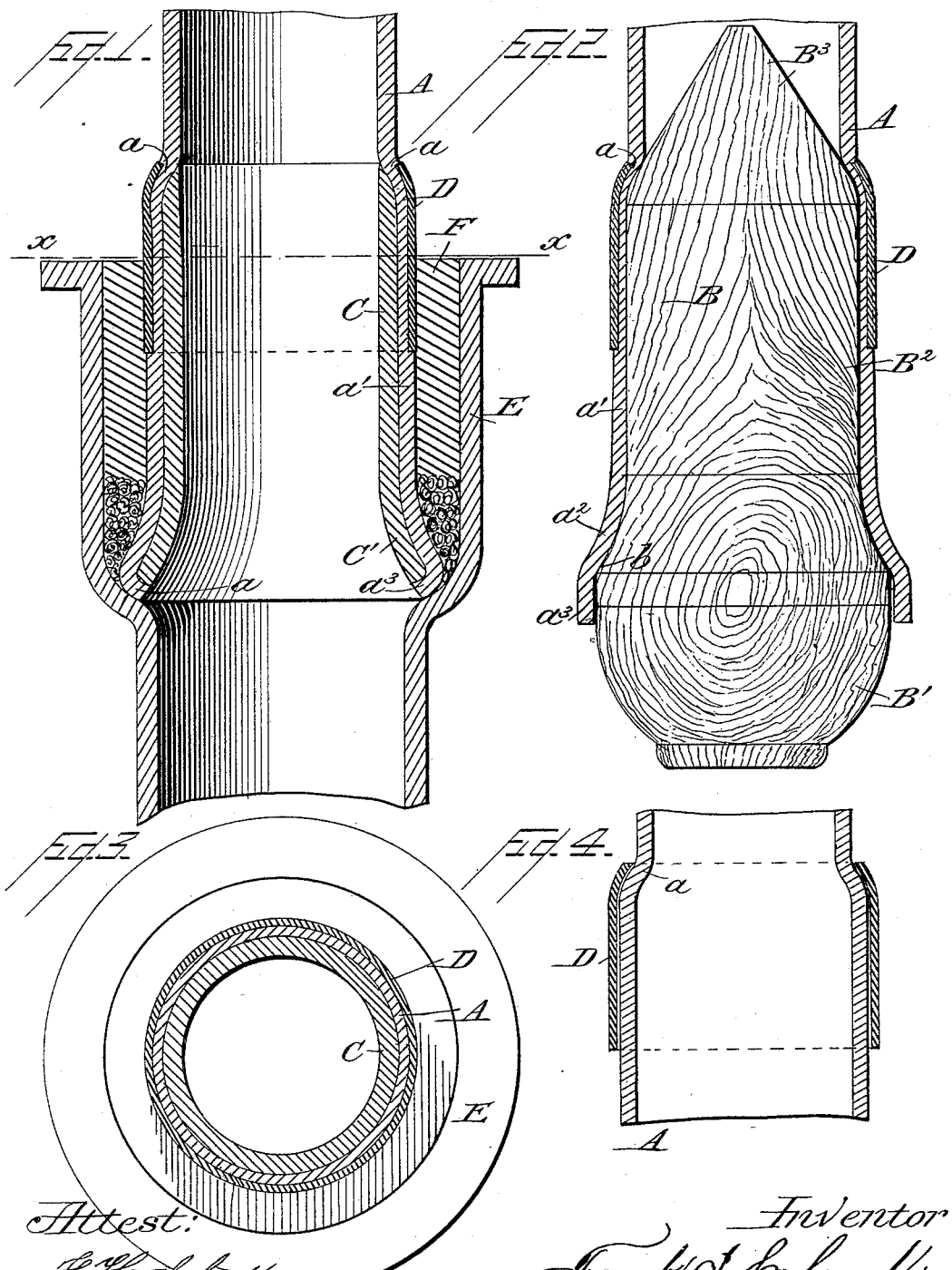

UNITED STATES PATENT OFFICE.

FRANK I. LESSARD, OF MANCHESTER, NEW HAMPSHIRE.

PIPE-JOINT.

SPECIFICATION forming part of Letters Patent No. 424,801, dated April 1, 1890.

Application filed December 10, 1889. Serial No. 333,229. (No model.)

*To all whom it may concern:*

Be it known that I, FRANK I. LESSARD, a citizen of the United States, residing at Manchester, in the county of Hillsborough and State of New Hampshire, have invented certain new and useful Improvements in Pipe-Joints; and I do hereby declare the following to be a full, clear, and exact description of the invention, such as will enable others skilled in the art to which it appertains to make and use the same.

My present invention has reference to an improvement in the joints or couplings of pipes of various kinds, the object being to complete and strengthen the connecting-joints of pipes and provide means whereby ferrules may be successfully introduced into pipes for the purpose of connecting the pipe and the hub in the various operations of plumbing; and the invention consists, essentially, in the construction, arrangement, and combination of parts, substantially as will be hereinafter described and claimed.

In the annexed drawings, illustrating my invention, Figure 1 is a longitudinal sectional view of the pipe, the hub, the ferrule within the pipe, the sleeve or ring around the pipe, and the calking, the several parts being arranged and combined in accordance with the principles of the present invention. Fig. 2 is a similar longitudinal sectional view of a pipe and its surrounding sleeve or ring, together with the expanding-tool (shown in elevation) located within the pipe in operative position for causing the enlargement of the end of said pipe. Fig. 3 is a cross-sectional plan on the line $x$ $x$ of Fig. 1. Fig. 4 is a longitudinal section of a portion of the pipe and the surrounding sleeve or ring, said ring being shown in the position it occupies when first located on the pipe before the latter has been expanded.

Like letters of reference designate corresponding parts throughout the different figures of the drawings.

A denotes a portion or section of the rod or other pipe, which pipe may be of any suitable size as respects its length and diameter, and may be adapted for any preferred use.

In carrying my invention into practical effect I first take such a pipe as A and expand or enlarge the diameter of the end portion thereof by means of a suitable tool or plugging device. B denotes this expanding-tool. It varies in diameter throughout different portions of its length. The portion of the largest diameter is lettered B' and constitutes the handle portion, it being nicely rounded and shaped to adapt it to be grasped by the mechanic when the tool is being forced into the end of the pipe.

B² indicates a section of a tool having a less diameter than the handle portion B', there being a gradually-rounded shoulder $b$ at the point where the diameter of the tool changes from the portion B' to the portion B². The inner end section of the tool is lettered B³, and this section is beveled, tapered, or inclined at a suitable angle, which beveling preferably renders this end section pointed. The section B² rounds neatly into the tapered portion B³, so that the junction between the two parts is not sharp. The cylindrical section B² is of such length that when it is inserted into the pipe it will produce a cylindrical enlargement thereof of a length corresponding substantially to the length of the ferrule C, which is adapted to be inserted into the end of the pipe after the expanding-tool has been withdrawn therefrom.

The effect produced upon the shape of the pipe by the forcible insertion thereinto of the expanding-tool is clearly evident from Figs. 1 and 2. The tapered end of the tool serves to form a rounded shoulder in the pipe at $a$. The cylindrical section B² will form the cylindrical pipe-section $a'$. The gradually sloping or curved shoulder $b$ on the tool will form the flaring part $a^2$ on the pipe. That part of the handle portion B' of the tool which enters the pipe will produce the pipe end $a^3$.

C denotes the ferrule. It is preferably made with a flaring mouth C'. This ferrule is adapted to be inserted within the pipe after the tool has been withdrawn from said pipe, and by looking at Fig. 1 the position of the ferrule within the pipe will be seen. The main portion of the ferrule fits nicely within the section $a'$ of the pipe, the inner end of said ferrule abutting neatly against the rounded pipe-shoulder $a$. The flaring mouth of the ferrule fits closely and neatly against the flaring part $a^2$ of the pipe, and the pipe end $a^3$ is folded over the end of the ferrule, said folded end being adapted, after the pipe end has been calked, to serve as a packing between the end of the ferrule and the inside of the hub in the iron pipe.

D denotes a band, sleeve, or ring, made of brass, copper, or any other expansive metallic substance, and shaped of the proper size to slip over the lead pipe A. This annular ring or sleeve is clearly shown in Figs. 1, 2, and 4. It is placed upon the pipe before the expansion of the same. Its position when first placed upon the pipe is indicated in Fig. 4, where it is seen to fit loosely upon the pipe. After the metallic sleeve has been located, as indicated in Fig. 4, the expanding-tool is then driven into the pipe in the manner that I have already described, and the result is that as the pipe is enlarged under the action of the expanding-tool this encircling sleeve or ring is securely fixed upon the pipe, being embedded more or less in the substance of the pipe, as shown in Figs. 1 and 2. By referring to these figures it will be seen that the substance of the pipe is compressed to a great degree opposite this sleeve. The sleeve or ring thus forms an important strengthening or auxiliary device.

In Fig. 1, E denotes the pipe-hub, which receives the end of the pipe, and F the calking material that is filled in around the expanded end of the pipe between it and the mouth end of the pipe-hub. The sleeve or ring D is placed upon the pipe at such a point that its middle point will come opposite the end of the hub—that is to say, on a line with the end of said hub—after the pipe has been inserted within the hub, as shown in Fig. 1. This ring or band is thus so situated that when the workman tamps the joint filled with molten lead the lead pipe will be protected from injury in tamping. Furthermore, it will not be liable to become punctured or broken by the operator when the joint is being calked. The band also serves a further purpose of acting as a shield to protect the lead pipe from being burned while the hot lead is being poured into the joint preparatory to calking. It will also be noticed that this ring or band is fixed in place firmly, securely, and immovably by the same operation which spreads or expands the pipe for the other purposes hereinabove noted, and that no extra blows or movements of the tool are necessary in order to accomplish this additional result of firmly locating the encircling band in place.

Having thus described my invention, what I claim as new, and desire to secure by Letters Patent, is—

1. In a pipe-joint, the combination of the pipe having the diametrically-enlarged section and enlarged end, the ferrule inserted within the enlarged section, over the end of which ferrule the enlarged pipe end is folded, the pipe-hub receiving the said pipe, and the encircling ring or band on the pipe, substantially as described.

2. The combination, with a pipe having an expanded end and a ferrule located within said end, of an encircling ring or band secured around the pipe during the operation of expanding the same, substantially as described.

3. The combination of the pipe having an expanded end, the ferrule within said expanded end having the pipe end folded over it, the metallic ring or band encircling the pipe and embedded therein during the operation of expanding said pipe, and the pipe-hub receiving the said pipe, substantially as described.

4. In combination with a pipe-hub, a pipe having an expanded end, a ferrule within said expanded end and a band or ring encircling the pipe and securely connected thereto during the operation of expanding said pipe, said band being so located that its middle point is opposite the end of the hub, substantially as described.

5. The combination of the pipe A, having the diametrically-enlarged section $a'$ and the enlarged end $a^3$, the ferrule C, inserted within the pipe-section $a'$, over the end of which ferrule the pipe end $a^3$ is folded, the encircling band or ring D, securely connected to the pipe during the operation of expanding, and the pipe-hub for receiving the said pipe, substantially as described.

6. The combination of the pipe A, having the rounded shoulder $a$, the straight cylindrical portion $a'$, the shoulder $a^2$, and the enlarged pipe end $a^3$, the ferrule C, inserted within the pipe-section $a'$, over the end of which ferrule the pipe end $a^3$ is folded, the band or ring D, surrounding the pipe and embedded therein during the operation of expanding said pipe, the hub E, receiving the expanded pipe end, and the calking material located between the pipe and the hub, substantially as described.

7. The herein-described method of strengthening pipes, consisting in surrounding the pipe with a metallic ring or band, then expanding the pipe so as to embed said band in the outer surface thereof, then inserting a ferrule into the expanded pipe, and finally folding the end of the pipe over said ferrule, substantially as described.

In testimony whereof I affix my signature in presence of two witnesses.

FRANK I. LESSARD.

Witnesses:
JOHN A. RIDDLE,
B. P. CILLEY.